United States Patent
Duesler et al.

(10) Patent No.: US 9,632,004 B2
(45) Date of Patent: Apr. 25, 2017

(54) METHODS FOR TESTING LASER SHOCK PEENING

(71) Applicant: UNITED TECHNOLOGIES CORPORATION, Farmington, CT (US)

(72) Inventors: Paul W. Duesler, Manchester, CT (US); Paul Filewich, Salem, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 201 days.

(21) Appl. No.: 14/423,671

(22) PCT Filed: Oct. 1, 2013

(86) PCT No.: PCT/US2013/062895
§ 371 (c)(1),
(2) Date: Feb. 24, 2015

(87) PCT Pub. No.: WO2014/055538
PCT Pub. Date: Apr. 10, 2014

(65) Prior Publication Data
US 2015/0185109 A1    Jul. 2, 2015

Related U.S. Application Data

(60) Provisional application No. 61/708,319, filed on Oct. 1, 2012.

(51) Int. Cl.
*G01M 15/14* (2006.01)
*G01M 7/08* (2006.01)
(Continued)

(52) U.S. Cl.
CPC ........... *G01M 7/08* (2013.01); *B23K 26/0069* (2013.01); *B23K 2201/001* (2013.01); *C21D 10/005* (2013.01); *C22F 1/18* (2013.01)

(58) Field of Classification Search
USPC .............................. 73/112.01, 112.03, 112.05
See application file for complete search history.

(56) References Cited

U.S. PATENT DOCUMENTS

| | | | |
|---|---|---|---|
| 5,492,447 A | 2/1996 | Mannava | |
| 6,238,187 B1 * | 5/2001 | Dulaney | B23P 6/005 416/223 R |

(Continued)

OTHER PUBLICATIONS

International Search Report Application No. PCT/US2013/062895 reported on Mar. 7, 2014.

(Continued)

*Primary Examiner* — Eric S McCall
(74) *Attorney, Agent, or Firm* — Cantor Colburn LLP

(57) ABSTRACT

A method for testing an edge of a rotor blade that has been hardened is disclosed. A shallow notch is created in the edge of the blade using a laser and the blade is then tested using an HCF process. If the blade passes the test, a deeper notch is imparted into the edge of the blade and the blade is retested. If the blade passes the second test, a third notch may be imparted into the edge of the blade and the blade is tested again. Any test failure may provide assistance in modifying the parameters used to harden the blade. The blade may be initially hardened using an LSP process.

20 Claims, 2 Drawing Sheets

(51) Int. Cl.
*B23K 26/00* (2014.01)
*C22F 1/18* (2006.01)
*C21D 10/00* (2006.01)
*B23K 101/00* (2006.01)

(56) References Cited

U.S. PATENT DOCUMENTS

| | | |
|---|---|---|
| 6,479,790 B1 | 11/2002 | Graham et al. |
| 6,541,733 B1 | 4/2003 | Mannava |
| 8,145,454 B2 | 3/2012 | Speldrich |
| 2007/0003417 A1* | 1/2007 | Mannava ............. C21D 10/005 416/241 R |
| 2008/0078477 A1* | 4/2008 | Bailey ...................... C21D 1/09 148/421 |
| 2010/0051141 A1 | 3/2010 | Bhambri |
| 2013/0052479 A1* | 2/2013 | Seetharaman ........... C21D 7/06 428/636 |
| 2013/0180968 A1* | 7/2013 | El-Wardany ....... B23K 26/0069 219/121.73 |
| 2016/0001395 A1* | 1/2016 | Filewich .............. C21D 10/005 219/121.85 |
| 2016/0356306 A1* | 12/2016 | Garrett ............... B23K 26/0069 |

OTHER PUBLICATIONS

Laser Shock Peening of F119 Integrally Bladed Rotors.
"Laser Shock Peening for Fatigue Resistance", Allan H. Clauer, LSP Technologies, Inc.

* cited by examiner

METHODS FOR TESTING LASER SHOCK PEENING

CROSS-REFERENCE TO RELATED APPLICATION

This application is a 35 U.S.C. §371 U.S. National Stage filing of International Patent Application No. PCT/US13/62895 filed on Oct. 1, 2013, claiming priority to U.S. provisional Patent Application No. 61/708,319 filed on Oct. 1, 2012.

BACKGROUND

Technical Field

This disclosure relates generally to turbo-machinery rotor components which may form stress risers during operation. More specifically, this disclosure relates to turbo-machinery rotor components enhanced by laser shock peening and testing of the effectiveness of such laser shock peening.

Description of the Related Art

Turbo-machinery such as gas turbine engines and, in particular, aircraft gas turbine engines include compressors with rotors and rotor blades that operate at high rotational speeds that subject the rotor and rotor blades to very high stress fields. These rotor and rotor blades are designed to operate in high stress fields and often contain features that are stress risers which subject the components to fatigue failure and reduced operating life.

It is expensive to refurbish and/or replace rotors and rotor blades in a gas turbine engine and, therefore, any means to increase rotor and rotor blade life is very desirable. Therefore, it is highly desirable to design and construct longer lasting rotor and rotor blade components that are better able to resist both low and high cycle fatigue than present rotor and rotor blade components.

Laser shock peening (LSP) or laser peening generally increases the resistance of metals and alloys to fatigue. LSP does this by using a high energy pulsed laser to produce residual compressive stresses into the surface of a part treated with LSP. The residual compressive stresses from LSP extend deeper below the surface than those from shot peening, usually resulting in a significantly greater benefit in fatigue resistance after laser peening. LSP has been used to improve fatigue capability in compressor rotors and rotor blades as disclosed in U.S. Pat. No. 6,541,733.

Testing the effects of LSP and other material property improvement processes on various parts, such as compressor rotor blades, can be expensive as a single part may need to be tested at numerous places and at numerous depths. Often, multiple parts must be sacrificed to complete the testing, especially for components where reliability is critical, such as rotor blades for compressors of gas turbine engines, such as aircraft engines. Hence, methods for efficient but thorough testing of rotor blades are needed.

SUMMARY OF THE DISCLOSURE

In one aspect, a method is disclosed for testing a leading edge or a trailing edge of a rotor blade. The method includes providing a blade with an edge to be tested and that has been subject to a material property improvement process. The material property improvement process may be carried out with a first set of parameters. The method may further include creating simulated damage to the rotor blade by creating a notch in the blade by removing material to produce a desired stress riser at a first depth in the edge of the blade. The method may then include performing a high cycle fatigue (HCF) test until a failure occurs within a desired or appropriate number of cycles. The appropriate number of cycles depends upon the part being tested and its application, but, for example, the number of test cycles for an aircraft rotor blade can range from over a million to a billion or more. If a failure occurs before a first predetermined number of cycles have been carried out, the method may include modifying the first set of parameters of the material property improvement process or acceptance of the tested capability level. If a failure does not occur before the predetermined number of cycles have been carried out, the method may then include imparting additional simulated damage to the blade by removing additional material to a second depth thereby creating a second notch in the edge of the blade wherein the second notch is larger and essentially consumes the first notch thereby producing a larger stress riser. The method then includes performing an HCF test until a failure occurs within a desired or appropriate number cycles. This process is repeated until either the stress riser is sufficient to meet a predetermined acceptable criteria level or acceptance of the demonstrated capability level.

In any one or more of the methods described above, the HCF test may be performed for at least 10 million cycles, 100 million cycles, a billion cycles or more, depending upon the part being tested and the requirements for the part.

In any one of the methods described above, the blade is a rotor blade of a compressor of a gas turbine engine. The compressor may be a high pressure compressor or a low pressure compressor.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiment illustrated in greater detail on the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION OF THE PRESENTLY PREFERRED EMBODIMENTS

Figure 1:
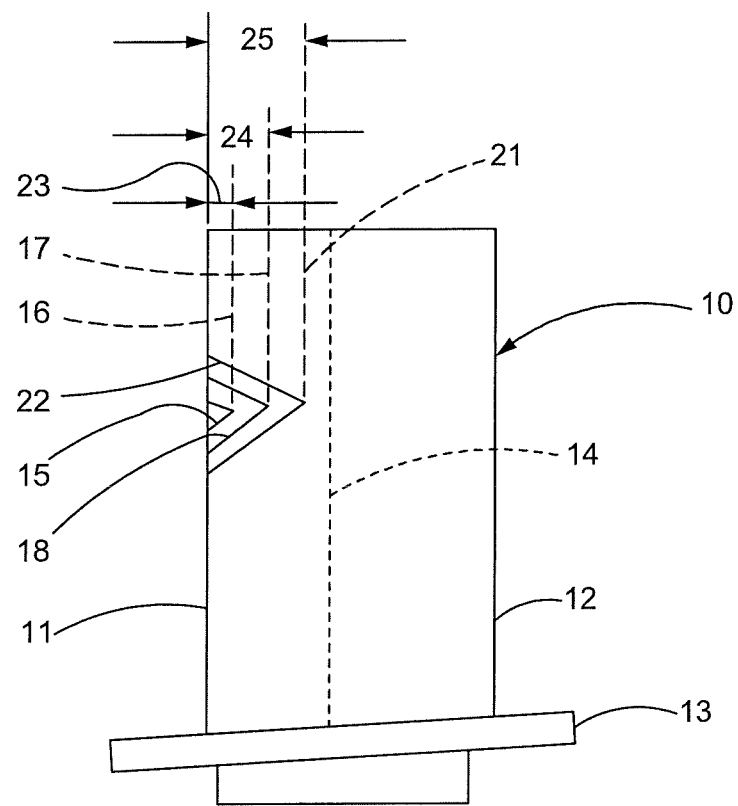
FIG. 1 is an illustration of a rotor blade illustrating the placement of the first, second and third notches of the disclosed method as well as an indication of the depth of a LSP material property improvement process.

Turning to FIG. 1, a rotor blade 10 is shown with a pair of opposing side edges 11, 12 and that is connected to a base 13 which, in turn, connects the blade 10 to a rotor (not shown). The blade 10 has been exposed to a material property improvement process that may be a LSP process. Other material improvement processes are available as will be apparent to those skilled in the art. In such a LSP process, the edge 11 would be covered with a material that is opaque to laser energy. Typically, such opaque material is in the form of black tape or paint and its purpose is to absorb energy. A transparent material is placed on top of the opaque material which, in many cases, may simply be a layer or a flow of water. The laser may be a high energy, pulsed neodymium-glass laser that produces pulses of short durations, from about 15 to about 30 nanoseconds. Such a laser may have a wave length of about 1.06 microns and with an energy per pulse of about 50 joules or more. Other lasers may be used as will be apparent to those skilled in the art.

The laser beam may be directed from the laser through an optical chain of mirrors and lenses onto the edge 11 of the blade 10. When the laser beam is directed at the edge 11, it passes through the transparent overlay and strikes the opaque overlay. When the beam strikes the surface of the opaque overlay, it immediately vaporizes a thin surface layer of the opaque overlay. This vapor then absorbs incoming laser energy, heats rapidly and expands against the edge 11 of the blade 10 as well as the transparent overlay. The transparent overlay overlaps the thermally expanding vapor and plasma against the edge 11 of the blade 10 and consequently causes the pressure to rise much higher than it would if the transparent overlay (e.g. water) were absent. Then, a sudden, high pressure against the edge 11 of the blade 10 causes a shock wave to propagate into the blade 10. When the peak stress of the shock wave is above the dynamic yield strength of the material of the blade 10, the material of the blade 10 yields and plastically deforms. As the stress wave propagates deeper into the blade 10, the peak stress of the wave decreases, but deformation of the material of the blade 10 continues until the peak stress falls below the dynamic yield strength. This plastic deformation caused by the shock wave gives rise to strain material property improvement and compressive residual stresses in the blade 10. As shown in FIG. 1, the depth of the strain material property improvement in the blade 10 caused by the LSP is indicated schematically by the phantom line 14. Disclosed herein is a method of testing the effectiveness of the LSP process described above and similar processes that may be carried out on parts like the rotor blade 10.

After the LSP process is carried out to an effective depth indicated at 14 in FIG. 1, a first notch 15 is imparted into the edge of the blade 11 by any of a variety of methods, as will be apparent to those skilled in the art. Material damaged by the creation of the notch may be removed thereby creating the first notch 15. After the first notch 15 is created, a high cycle fatigue (HCF) test is conducted for a predetermined number of cycles or until a failure occurs. If a failure occurs, the material property improvement parameters used to harden the blade 10 may be modified or the tested capability level may be accepted.

If a failure does not occur at the first notch 15 before a predetermined number of cycles have been carried out, a second notch 18 at a second depth 17 may be created in the blade 10 by any number of conventional means, with the damaged blade material being removed to form the notch 18. After the creation of the second notch 18, another HCF test is carried out for a predetermined number of cycles or until a failure occurs. If a failure occurs, the parameters used for the material property improvement process may be modified or the tested capability level may be accepted. If a failure does not occur, a third notch 22 may be created at a third depth indicated at 21 in FIG. 1. Damaged material is removed by conventional means thereby creating a third notch 22. Then, another HCF test may be carried out for a predetermined number of cycles or until a failure occurs. If a failure occurs, the material property improvement parameters (or the LSP parameters) may be modified or the tested capability level may be accepted.

A single laser may be used for the material property improvement process, which may be a LSP process. The laser may also be used for the creation of the notches 15, 18 and 22, but the notches may be created in any number of different ways using tools other than lasers. Alternatively, different lasers for the material property improvement process and for the creation of the notches 15, 18 and 22 may also be utilized. Further, the HCF test may be performed for more than 10 million cycles, such as 100 million cycles or a billion cycles or more. Further, the effective depth of the material property improvement process or the LSP process, if utilized, may be deeper than the notches 15, 18 and 22 as shown by the phantom line 14 in FIG. 1.

The first notch 15 has a first depth 23, that may be referred to as a start notch depth. If the blade 10 fails the HCF test with only a first notch 15 disposed in the edge 11 of the blade 10, then the material property improvement process may be modified or the test performance may be accepted. The depth 24 of the second notch 18 may be the required depth, meaning that the blade 10 is intended to function despite having a notch 18 of a depth 24 disposed in the edge 11 of the blade 10. Thus, if the blade 10 fails the HCF test with the second notch 18 disposed in the edge 11, the parameters of the material property improvement or the LSP process may be modified or accepted. The depth 25 of the third notch 22 may be referred to as the failure depth. The blade 10 may fail the HCF test with a notch the size of the notch 22 in the edge 11. Regardless, if the blade 10 passes the HCF test with a notch the size of the notch 22 in the edge 11, the parameters used for the material property improvement or the LSP process may or may not require modification.

Figure 2:
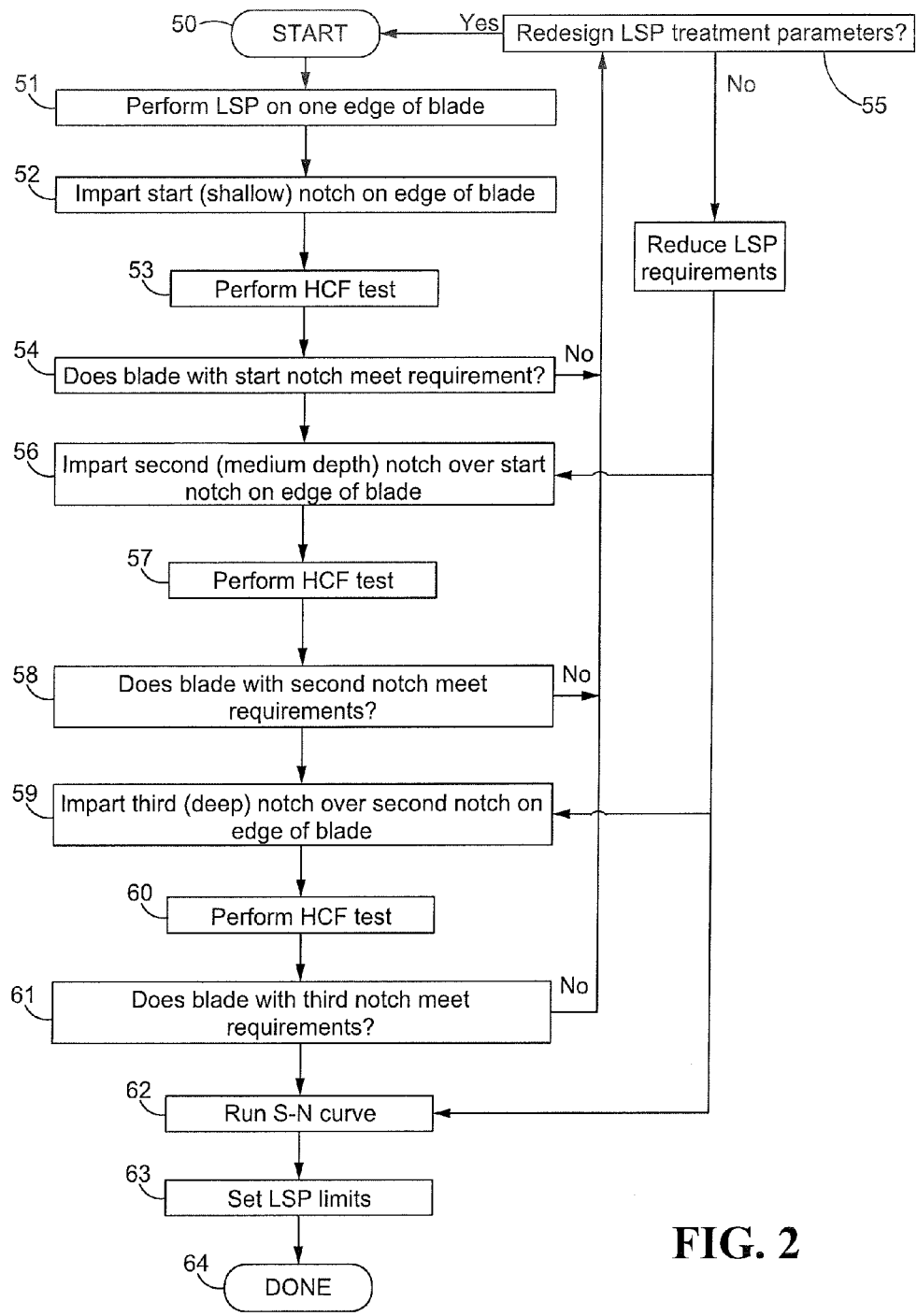
FIG. 2 is a flow diagram illustrating a disclosed method.

Turning to FIG. 2, one disclosed method for testing the effectiveness of laser shock peening is shown. The method may start at 50 where, at part 51, a LSP process is performed on one edge 11 of the blade 10 to an effective depth indicated at 14 in FIG. 1. Returning to FIG. 2, at part 52, a shallow notch 15 is placed in the edge 11 of the blade 10. Material damaged by the creation of the notch may be removed by conventional means for purposes of forming the notch 15. Then, at part 53, a HCF test may be performed. If the blade 10 does not meet predetermined requirements at part 54, the material property improvement parameters (or the LSP treatment parameters) may be modified at part 55 or accepted at part 54. A second notch 18 may be imparted into the edge 11 of the blade 10 at part 56. Again, damaged material may be removed by conventional means. Then, another HCF test may be performed at part 57 and, if the blade 10 does not meet the predetermined requirements at part 58, the treatment parameters may be changed at part 55 as shown in FIG. 2 or accepted at part 58. A third notch 22 may be imparted into the edge 11 of the blade 10 at part 59 and another HCF test may be performed at part 60. Because the third notch 22 extends to a failure depth 25 (FIG. 1), the material property improvement treatment parameters may not need to be modified at part 55 if the blade 10 with the third notch 22 disposed therein fails the HCF test at part 60. However, the parameters may be optionally modified. If the blade does meet the predetermined requirements at part 61, a S-N curve may be prepared at part 62 and the material property improvement parameters (or LSP parameters) or limits may be set at part 63. The method may be completed at part 64.

In the example shown, only three notches 15, 18, 22 are created. Obviously, this number can vary and anywhere from a single notch to several or more notches may be created and tested, depending on the part, its size and its use. Further, as will be apparent to those skilled in the art, material property improvement processes other than LSP may be utilized within the spirit and scope of this disclosure.

INDUSTRIAL APPLICABILITY

Methods are disclosed for evaluating material property improvement procedures carried out on metallic parts, such as rotor blades. For example, methods of evaluating laser shock peening procedures carried out on turbine and compressor rotor blades of gas turbine engines are disclosed. After the material property improvement or LSP process is carried out on a rotor blade, a series of increasingly larger notches are imparted into the edge of the rotor blade. After each notch is formed, a high cycle fatigue test may be carried out to ensure that the rotor blade is safe or has sufficient endurance limit or fatigue strength notwithstanding the presence of a notch along one of its edges. The notches may become increasingly larger until a notch that is large enough to cause an expected failure of the rotor blade is created. After the high cycle fatigue test is carried out after each notch, any failure may resolve in modification of the parameters of the material property improvement (e.g., LSP) process. Thus, the disclosed method provides a means for improving material property improvement processes such as laser shock peening processes and provides a means for evaluating the extent at which a blade may be damaged before it should be replaced. As shown above, a shallow notch, such as a start notch would normally not require the blade to be replaced. However, a notch reaching a failure depth would normally require the blade to be replaced.

While only certain embodiments have been set forth, alternatives and modifications will be apparent from the above description to those skilled in the art. These and other alternatives are considered equivalents and within the spirit and scope of this disclosure and the appended claims.

The invention claimed is:

1. A method for testing a leading or trailing edge of a rotor blade, the method comprising:
   providing a laser;
   providing a blade with an edge to be tested and that has been subjected to a material property improvement process, the material property improvement being carried out with a first set of parameters;
   pulsing the laser at a location on the edge of the blade at a first energy for a first pulse period to cause a shock wave to penetrate the edge of the blade to a first depth;
   removing material damaged by the laser to the first depth thereby creating a first notch in the edge of the blade;
   performing a high cycle fatigue (HCF) test for at least $10^6$ cycles or until failure Occurs;
   if failure occurs before a first predetermined number of cycles have been carried out, modifying the first set of parameters;
   if failure does not occur before the first predetermined number of cycles has been carried out, pulsing the laser at the first notch and at a second energy for a second pulse period to cause a shock wave to penetrate the edge of the blade at the first notch to a second depth;
   removing material damaged by the laser to the second depth thereby creating a second notch in the edge of the blade;
   performing an HCF test for at least $10^6$ cycles or until failure occurs;
   if failure occurs, modify the first set of parameters;

if failure does not occur, pulsing the laser at the second notch and at a third energy for a third pulse period to cause a shock wave to penetrate the edge of the blade at the second notch to a third depth;
   removing material damaged by the laser to the third depth thereby creating a third notch in the edge of the blade;
   performing an HCF test for at least $10^6$ cycles or until failure occurs;
   if failure occurs, modify the first set of parameters.

2. The method of claim 1 wherein the HCF tests are performed for at least $10^7$ cycles.

3. The method of claim 1 wherein the HCF tests are performed for about $10^8$ cycles.

4. The method of claim 1 wherein the material property improvement process is a laser shock peening (LSP) process that produces one or more shock waves that extend to a fourth depth from the edge into the blade, and the third depth is shallower than the fourth depth.

5. The method of claim 1 wherein the first, second and third energies are about equal.

6. The method of claim 1 wherein the first, second and third pulse periods are about equal.

7. The method of claim 1 wherein the first, second and third energies are different.

8. The method of claim 1 wherein the first, second and third pulse periods are different.

9. The method of claim 1 wherein the blade is a rotor blade of a turbine of a gas turbine engine.

10. The method of claim 1 wherein the blade is a rotor blade of a compressor of a gas turbine engine.

11. A method for testing the effects of a laser shock peening (LSP) process on a leading or trailing edge of a rotor blade of a gas turbine engine, the method comprising:
    providing a laser;
    providing the blade with an edge to be tested and that has been subjected to the LSP process, the LSP process being carried out with LSP parameters;
    coating the edge of the blade with material that is transparent to the laser;
    pulsing the laser at a location on the edge of the blade at a first energy for a first pulse period to cause a shock wave to penetrate the edge of the blade to a first depth;
    removing damaged material to the first depth thereby creating a first notch in the edge of the blade;
    performing a high cycle fatigue (HCF) test for at least $10^6$ cycles or until failure Occurs;
    if failure occurs before a first predetermined number of cycles have been carried out, modifying the LSP parameters;
    if failure does not occur before the first predetermined number of cycles has been carried out, coating the edge and the first notch with material that is transparent to the laser;
    pulsing the laser at the first notch and at a second energy for a second pulse period to cause a shock wave to penetrate the edge of the blade at the first notch to a second depth;
    removing damaged material to the second depth thereby creating a deeper second notch in the edge of the blade;
    performing an HCF test for at least $10^6$ cycles or until failure occurs;
    if failure occurs, modify the LSP parameters;
    if failure does not occur, coating the edge and the second notch with material that is transparent to the laser;

pulsing the laser at the second notch and at a third energy for a third pulse period to cause a shock wave to penetrate the edge of the blade at the second notch to a third depth;

removing damaged material to the third depth thereby creating a deeper third notch in the edge of the blade;

performing an HCF test for at least $10^6$ cycles or until failure occurs;

if failure occurs, modify the LSP parameters;

if failure does not occur, create an S-N curve.

12. The method of claim 11 wherein the HCF tests are performed for at least $10^7$ cycles.

13. The method of claim 11 wherein the HCF tests are performed for about $10^8$ cycles.

14. The method of claim 11 wherein the LSP process produces one or more shock waves that extend to a fourth depth into the blade, and the third depth is shallower than the fourth depth.

15. The method of claim 11 wherein the first, second and third energies are about equal.

16. The method of claim 11 wherein the first, second and third pulse periods are about equal.

17. The method of claim 11 wherein the first, second and third energies are different.

18. The method of claim 11 wherein the first, second and third pulse periods are different.

19. The method of claim 11 wherein the laser used for the LSP process and the laser used to create the first, second and third notches are the same.

20. A method for testing the effects of a laser shock peening (LSP) process on a leading or trailing edge of a rotor blade of a gas turbine engine, the method comprising:

providing a laser;

providing the blade with an edge to be tested and that has been subjected to the LSP process, the LSP process being carried out with LSP parameters;

coating the edge of the blade with material that is transparent to the laser;

pulsing the laser at a location on the edge of the blade at a first energy for a first pulse period to cause a shock wave to penetrate the edge of the blade to a first depth;

removing damaged material to the first depth thereby creating a first notch in the edge of the blade;

performing a high cycle fatigue (HCF) test for at least $10^7$ cycles or until failure Occurs;

if failure occurs before a first predetermined number of cycles have been carried out, modifying the LSP parameters;

if failure does not occur before the first predetermined number of cycles has been carried out, coating the edge and the first notch with material that is transparent to the laser;

pulsing the laser at the first notch and at a second energy for a second pulse period to cause a shock wave to penetrate the edge of the blade at the first notch to a second depth;

removing damaged material to the second depth thereby creating a deeper second notch in the edge of the blade;

performing an HCF test for at least $10^7$ cycles or until failure occurs;

if failure occurs, modify the LSP parameters;

if failure does not occur, coating the edge and the second notch with material that is transparent to the laser;

pulsing the laser at the second notch and at a third energy for a third pulse period to cause a shock wave to penetrate the edge of the blade at the second notch to a third depth;

removing damaged material to the third depth thereby creating a deeper third notch in the edge of the blade;

performing an HCF test for at least $10^7$ cycles or until failure occurs;

if failure occurs, modify the LSP parameters;

if failure does not occur, create an S-N curve.

\* \* \* \* \*